March 7, 1961   J. A. PALMER   2,973,789
PANEL MOUNTED ANGULARLY ADJUSTABLE TOOLS
Filed June 25, 1959   3 Sheets-Sheet 1
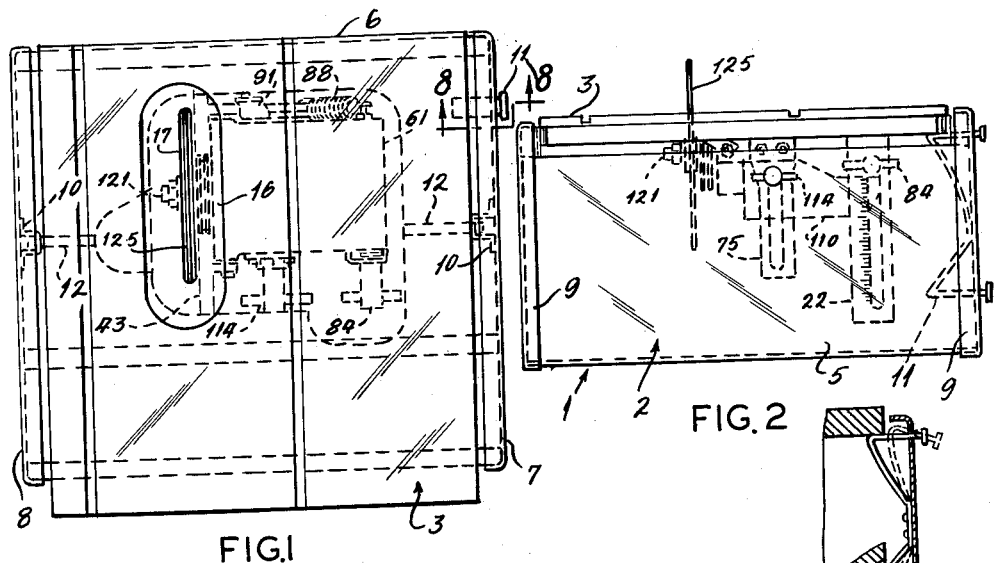
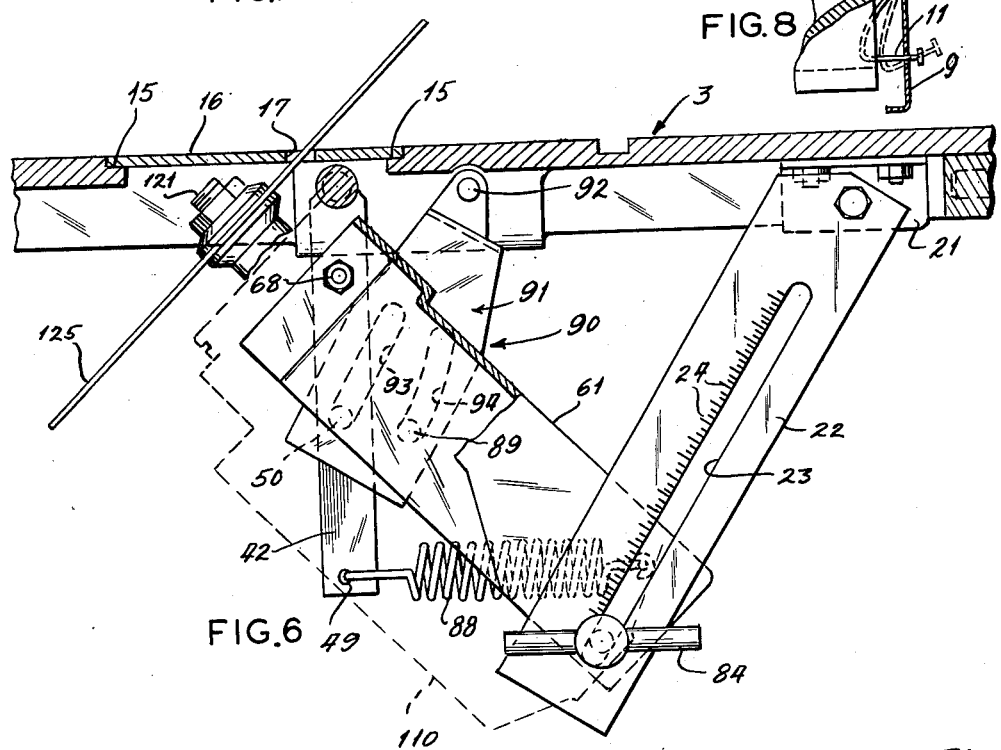
INVENTOR:
JOHN A. PALMER
By Sutherland, Pohlin & Taylor
ATTORNEYS.

INVENTOR
JOHN A. PALMER
ATTORNEYS

March 7, 1961

J. A. PALMER 2,973,789

PANEL MOUNTED ANGULARLY ADJUSTABLE TOOLS

Filed June 25, 1959

INVENTOR:
JOHN A. PALMER
By Sutherland, Potts & Taylor
ATTORNEYS.

United States Patent Office 2,973,789
Patented Mar. 7, 1961

2,973,789

PANEL MOUNTED ANGULARLY ADJUSTABLE TOOLS

John A. Palmer, University City, Mo., assignor to The Emerson Electric Manufacturing Company, St. Louis, Mo., a corporation of Missouri Filed June 25, 1959, Ser. No. 822,911

9 Claims. (Cl. 143—36)

This invention relates to base-mounted tools the angularity of a part of which is adjustable, such, for example, as circular saws of the type known as bench saws, in which the blade angle can be adjusted. It has particular application and is described as applied to bench saws utilizing a circular saw in which the spindle, on which the saw blade is mounted, is geared directly to or driven directly by a motor, but its utility is not confined to such a tool.

Bench saws should be adjustable for depth of cut and for angle of cut. In the past, it has been common practice to journal the blade-carrying spindle and the motor by which the spindle was driven, in a cradle, sliding on an arcuate track, the curvature of the track being substantially a segment of a circle with its center at the point of intersection of the plane of the table top with the plane of the saw blade in its vertical position. In such saws the spindle was usually driven by a pulley. The cradle and track structure is heavy, and requires machining. Additionally, it is not well adapted to use with a circular saw in which the saw-carrying spindle is directly geared to or directly driven by its power source.

The advantages, in compactness, economy, weight reduction and simplicity, of direct gearing of the blade-carrying spindle to a power source have been recognized in the numerous portable circular saws now in use. In those portable circular saws which permit adjustment of the angle of cut, the saw is hinged to a sole plate, offset from the blade. Such saws have been mounted on the undersides of tables, by clamping or otherwise mounting the sole plate on the under surface of a table, permitting the blade of the saw to project through a slot in the table top. There are two especial disadvantages in such a system. It is difficult to adjust either the angularity of the cut or the depth of cut of such a saw after it is mounted. It is also necessary in such an arrangement, to make the slot, through which the blade extends, unduly wide. This is both inconvenient and dangerous. The necessity for a wide slot arises from the fact that the saw is pivoted on a hinge pin offset laterally from the blade, so that as the saw is tilted, the blade is translated transversely of the slot through which it projects.

One of the objects of this invention is to provide a simple apparatus by which a part of a base-mounted tool may be tilted about a fixed imaginary axis.

Another object is to provide such a tool in which little or no machining of the parts constituting the apparatus is required.

Another of the objects of this invention is to provide a bench saw, in which the saw blade is carried by a spindle geared directly to or driven directly by a motor, which saw is easily adjusted both as to depth of cut and angularity of cut.

Another object is to provide such a saw in which the blade tilts about an axis defined substantially by the intersection of the planes of the table top and the blade of the saw when the blade is perpendicular to the table top, so as to permit the use of a narrow slot.

Still another object of this invention is to provide such a saw which is rugged, accurate, simple, safe, inexpensive to manufacture, and economical to maintain.

Other objects will become apparent to those skilled in the art in the light of the following description and accompanying drawing.

In accordance with this invention, generally stated, a base-mounted tool, such as a circular, bench type saw, is provided in which a part, such as the saw blade, can be tilted angularly about a fixed, imaginary tilt axis. The tool is hinged mediately to the base on an axis parallel with but laterally offset from the desired tilt axis. Means are provided for moving the tool hinge axis laterally as the tool is rotated about its hinge axis, and guide means are provided for coordinating the action of the hinge axis moving means with the rotation of the tool about its hinge axis, in such a way, as to cause the part to tilt about the desired tilt axis. Preferably the tool is also adjustable heightwise of the base, and all of the adjustment, angular and heightwise, is accomplished by rotation about simple ginglymi.

In the bench saw illustrating the preferred embodiment of this invention, a yoke, with parallel arms extending at right angles to its hinge axis, is hingedly mounted on the underside of a table top. The hinge axis of the yoke is parallel to but laterally spaced from the desired tilt axis. A (saw) motor support is hinged to the yoke arms on an axis parallel with the yoke axis. A saw (motor) is hinged to the motor support on an axis at right angles to the yoke axis. A cam plate is interconnected to the table top, a yoke arm and the saw support, to coordinate the rotation of the support on the yoke with the rotation of the yoke on the table top, in such a way that the blade of the saw tilts about the desired tilt axis. The tilt axis in this instance is defined by the intersection of the plane of the table top and the plane of the saw blade when the blade is perpendicular to the table top. A handle, carried by the saw motor, opposite the saw motor hinge on the motor support, serves as a convenient manipulating means and, with a depth gauge plate mounted on the motor support serves to clamp the saw at the desired depth of cut. Another handle, this one carried by the motor support, serves as a convenient manipulating means for varying the angularity of cut, and, with an angular adjustment clamp plate, serves as a clamping means to maintain the saw in its desired angular position. The table top is pivoted, so that it can be swung up to give immediate access to the depth and angularity-controlling handles. The table is held in either operative, level position or swung-up position, by a latch.

In the drawing,

Figure 1 is a top plan view of a bench saw constructed in accordance with one illustrative embodiment of this invention;

Figure 2 is a view in front elevation of the bench saw of Figure 1;

Figure 6 (Sheet 1) is a sectional view corresponding to the view shown in Figure 4, but with certain parts broken away, showing the saw in tilted position;

Figure 8 is a sectional view taken along the line 8—8 of Figure 1.

Figure 3:
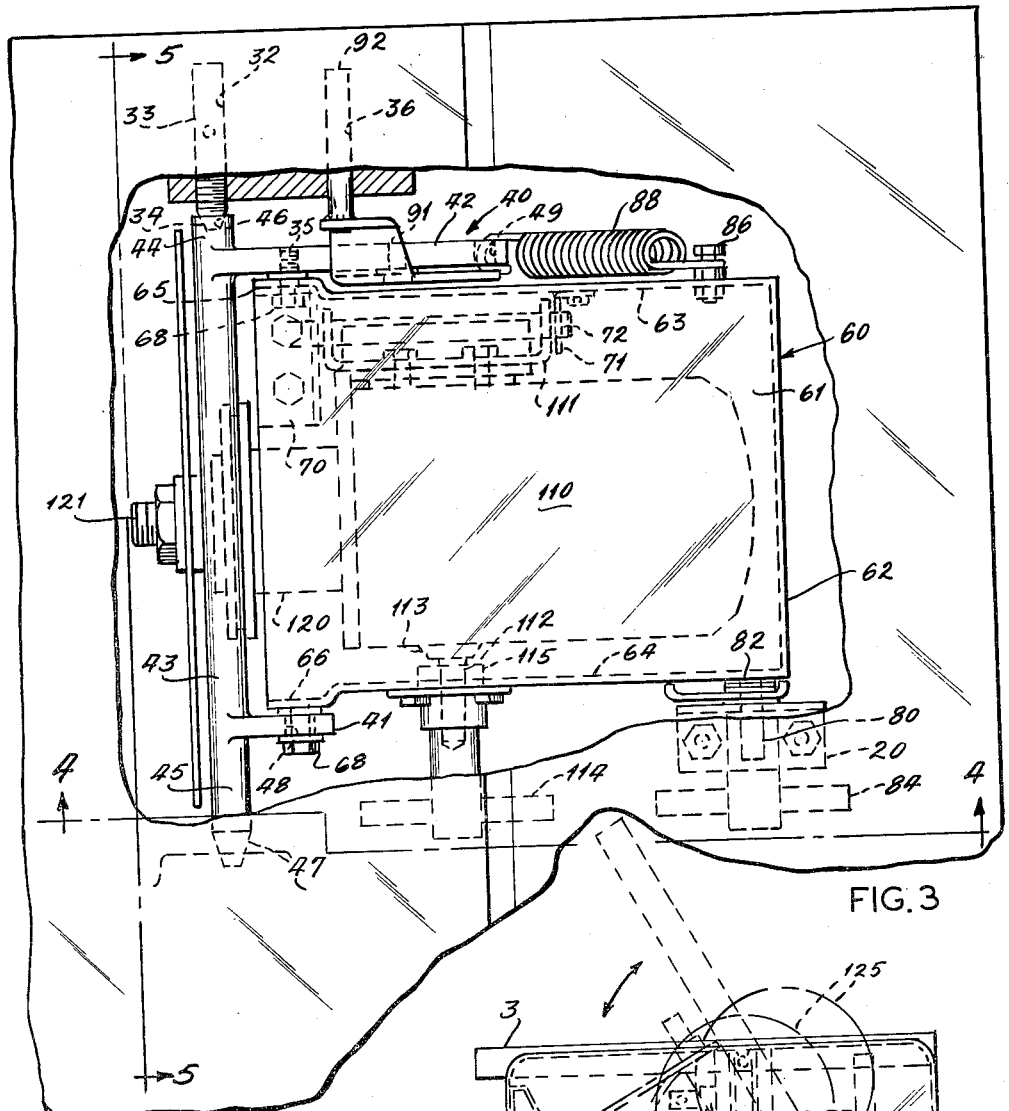
Figure 3 is a fragmentary, enlarged top plan view, partly broken away, of the bench saw shown in Figures 1 and 2.

Referring now to the drawing for one illustrative embodiment of device of this invention, the principal components of the bench saw of this embodiment are a table 1, made up of a sheet metal base structure 2 and a cast iron top 3, hinged to the base 2; a yoke 40, (Figures 3 and 5), hinged to the underside of the top 3; a motor support 60, hinged to the yoke 40; a guide system 90 (Figures 2 and 4), interconnecting the top, yoke and motor support, and a motor 110, hinged to the motor support 60 at right angles to the hinge axis of the yoke on the table top and the motor support on the yoke.

Figure 7:
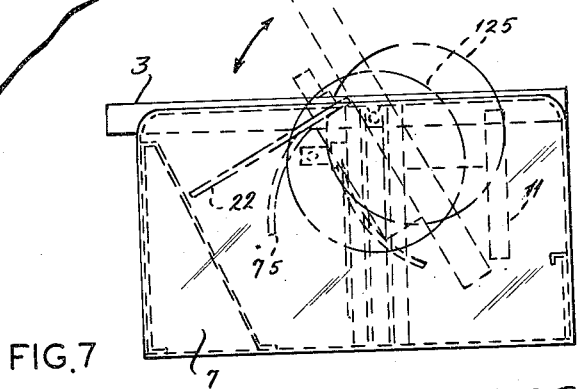
Figure 7 (Sheet 2) is a view in side elevation showing, in dotted lines, the table top in tilted position.

The base structure 2 of the table 1 includes a front panel 5, a back panel 6, a right side panel 7 and a left side panel 8. Each of the side panels 7 and 8 has an inturned flange 9, around its entire periphery, which serves as a stiffening member, and a convenient area in which to weld the front and back panels to the side panels. Additional stiffening and strengthening members, such as are indicated in dotted lines in Figure 7, are provided to give whatever strength and rigidity are necessary or desirable to the base 2. On the inside surface of each of the side panels 7 and 8, a footed channel iron 10 (Figure 1) is welded, extending vertically between the lower and upper reaches of the flange 9. The channel irons 10 are provided with keyhole slots into which necked ends of stub shafts 12, mounted on the underside of the top 3, are dropped. In this way, the table 3 is tiltably mounted on the base 2.

The upper surface of the top 3 is provided with the usual channels to accommodate a gauge. The table top is cut away as shown in Figure 1, and the edges of the top defining the semi-eliptical opening are provided with a shoulder 15 (Figure 6), to support a relatively thin plate 16. The plate 16 has a slot 17 running in the direction of its long axis.

Figure 4:
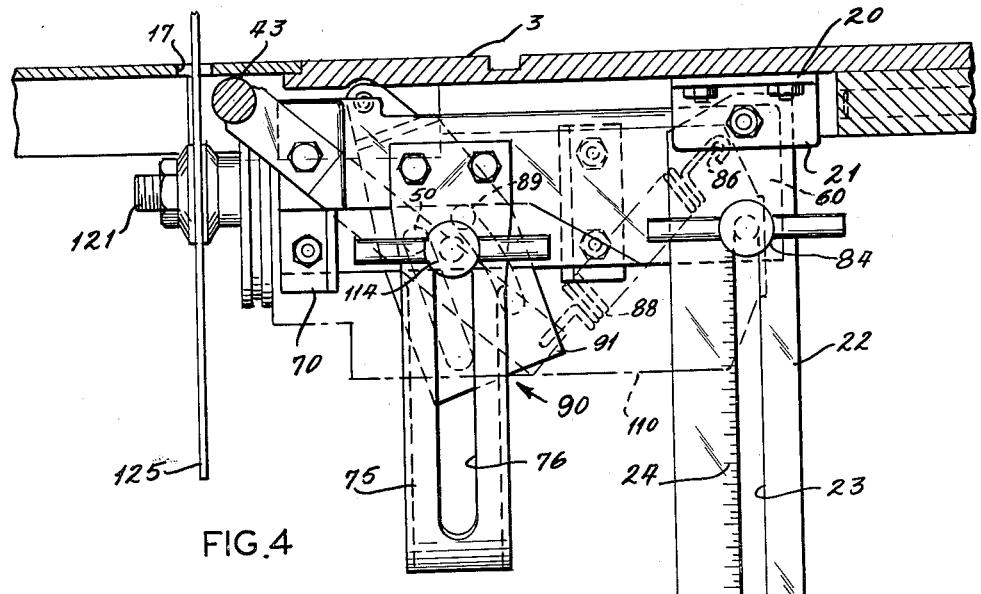
Figure 4 is a sectional view taken along the line 4—4 of Figure 3.

An angular adjustment guide plate bracket 20 (Figure 4) is bolted to the underside of the table top 3. The bracket 20 has a depending part 21, upon which an angular adjustment clamp plate 22 is pivotally mounted. The angular adjustment clamp plate 22 has a long slot 23 extending lengthwise of the plate, along one side of which slot, is a series of calibration marks 24. The angular adjustment clamp plate 22 is generally rectangular, and hangs from the pivot in the bracket 20. One upper corner of the angular adjustment clamp plate 22 is cut away, as shown in Figures 4 and 6, to provide clearance between that corner of the plate and the underside of the top 3 when the plate 22 is swung to the position shown in Figure 6.

In the embodiment shown, spaced bosses 25 and 30 (Figure 5) are cast integrally with the underside of the table top 3. The boss 25 is provided with a countersocket 27 facing the boss 30. Two parallel, passages, 32 and 36, extend through the boss 30. The passage 32 is internally threaded, and is aligned with the countersocket 27, parallel with the slot 17 in the top plate 16. An externally threaded trunnion pin 33, with a conical end 34 is screwed into the passage 32, with the end 34 extending beyond the boss 30, toward the countersocket 27.

The heavy yoke 40 is pivotally mounted between the pin 33 and countersocket 27. The yoke 40 has a short yoke arm 41, a long yoke arm 42 parallel with the short yoke arm 41, a trunnion shaft 43, to which the arms 41 and 42 are welded, and trunnions 44 and 45, integral with the trunnion shaft 43. The trunnion 44 is provided with a counter socket 46, into which the conical end 34 of the trunnion pin 33 extends. The trunnion 45 is provided with a conical nose 47, extending into the countersocket 27. The short yoke arm 41 (Figure 3) has a hole 48 transversely through it. The long arm 42 has a small hole 49 at its lower end, a drilled and tapped hole 35 aligned with the hole 48 in the short arm 41, in a direction parallel with the trunnion shaft 43, and a pin 50 (Figures 4 and 6) projecting in a direction toward the short arm 41, parallel with the trunnion shaft 43, intermediate the two holes.

The yoke 40, which is itself pivotally mounted on the top 3, in turn pivotally carries the motor support 60, as shown in Figure 3. The motor support 60 has a generally rectangular, inverted pan shaped frame, with a top 61, rear wall 62, motor hinge side 63 and clamp plate side 64. Near the free end edges of the sides 63 and 64, they are offset outwardly to form flats 65 and 66 respectively. The motor support 60 is hinged to the legs 41 and 42 of the yoke 40, by means of hinge pins 68. In the embodiment shown, one of the hinge pins 68 is shown as extending through the hole 48 in the short yoke arm 41, and being secured to the flat 66, while the other hinge pin 68 is shown as extending through a hole in the flat 65, and taking into the tapped hole 35 in the long arm 42 of the yoke 40. The hinge pins 68 are aligned with one another, and lie parallel with the yoke shaft 43. The hinge pins 68 are symmetrically arranged with respect to the flat 65 and 66, so that the edge of the motor support 60 adjacent the yoke trunnion shaft 43 is parallel therewith.

A left hinge bracket 70 is bolted to the inside surface of the flat 65, and to the underside of the top 61. A right hinge bracket 71 is fastened to the inside surface of the hinge side 63. The hinge brackets 70 and 71 carry a pintle 72, lying parallel with the side 63 and at right angles to the yoke trunnion shaft 43.

On the outer surface of the clamp side 64, a depth gauge plate 75 (Figures 4 and 5) is rigidly bolted. The depth gauge plate 75 is curved on a radius with the axis of the pintle 72 as its center. The depth gauge plate 75 is provided with a slot 76 running lengthwise of the plate. While not shown in the drawing, calibration marks can be placed along one margin of the slot 76.

Also, projecting from a boss 82 on the outer surface of the clamp side 64, near the meeting corner of the side 64 with the back side 62, is a threaded shaft 80 (Figure 3), extending through the slot 23 in the angular adjustment clamp plate 22. The boss 82, from which shaft 80 projects, provides an annular shoulder which makes sliding contact with the inner surface of the angular adjustment clamp plate 22, on either side of the slot 23. An internally threaded handle 84, is screwed onto the shaft 80, whereby the angular adjustment clamp plate 22 can be clamped between the handle 84 and the boss 82.

A spring anchor pin 86 is mounted on and projecting outwardly from the hinge side 63 of the motor support 60. A coil spring 88 is hooked at one end to the anchor pin 86, and at its other end to the long arm 42 of the yoke 40, through the hole 49. A motor support guide pin 89 projects outwardly from the hinge side 63, somewhat below the center of the side 63 heightwise, and somewhat toward the open end of the support frame with respect to the center lengthwise of the side 63.

The complete guide system 90 would include the top 3, the yoke 40, the motor support 60, and the angular adjustment clamp plate 22. However, the element which interconnects the top, yoke, and motor support in such a way as to produce the desired resultant angular motion of the saw blade, is a cam plate 91 (Figures 4 and 6). The cam plate 91 is positioned between the long yoke arm 42 and the outer surface of the hinge side 63 of the motor support 60. The cam plate 91 is carried by a shaft 92 journaled in the passage 36 through the boss 30. The cam plate 91 is provided with two slots. The first is a yoke pin slot 93. The yoke pin slot 93 is straight, and extends adjacent and along the edge of the cam plate nearest the trunnion shaft 43. The pin 50 of the long yoke arm 42 extends through and rides in the yoke pin slot 93. The second slot is a motor support pin slot 94. The slot 94 is arcuate, and lies adjacent the edge of the cam plate 91 most remote from the trunnion shaft 43. The motor support pin 89 extends through and rides in the slot 94.

The motor 110 is hinged to and within the motor support 60 by means of a motor hinge bracket 111 (Figure 3), bolted to one side of the motor 110 parallel to the bore axis of the motor, and rotatably supported on the pintle 72. A threaded shaft 112, fixedly secured within a boss 113 in the side of the motor casing opposite the motor hinge bracket 111, extends through the slot 76 in the depth gauge plate 75. An internally threaded handle 114 is screwed onto the threaded shaft 112, to clamp the depth gauge plate 75 between the handle 114 and a collar 115 on the shaft 112.

The motor 110 is provided with a gear box 120, from which a spindle 121 extends. A circular blade 125 is mounted on the spindle 121 in the usual manner.

The way in which the device is assembled, i.e., the way in which the motor is mounted in the motor support 60, the way in which the motor support 60 is mounted on the yoke 40, and the way in which the yoke 40 is mounted on the underside of the table top 3, is immediately apparent from a look at Figure 3.

In practice, a guard is provided around the underside of the blade 125. A latch 11, shown somewhat diagrammatically in Figures 1, 2 and 7, is arranged to hold the table top 3 in either its level or tilted positions.

Figure 5:
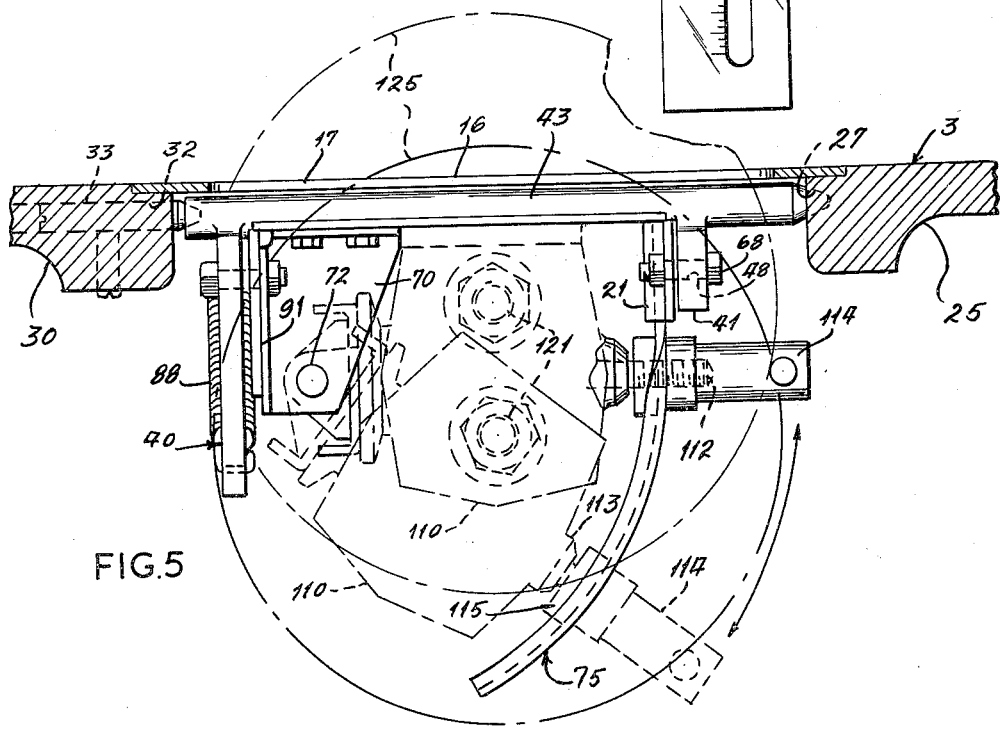
Figure 5 is a sectional view taken along the line 5—5 of Figure 3.

In operation, the blade is adjusted for depth of cut by tilting the top 3 to its fully tilted position, shown in Figure 7. The handle 114 is loosened, and the motor 110 is rocked up or down, about the pintle 72, to the desired depth of cut. The tilt of the table top is such that the operator can hold a gauge block or rule along the blade, and move the blade up and down with his other hand, until he has set the depth of cut where he desires it, as shown in Figure 5.

In making adjustment for the desired angle of cut, it is only necessary to tilt the table top to the same, tilted, position, loosen the handle 84, and move the handle up or down, between the position shown in Figure 4 and that shown in Figure 6, those figures representing the extremes of angular movement of the blade. As can be seen from Figures 4 and 6, the blade tilts about an axis which is substantially defined by the intersection of the plane of the table top and the plane of the blade.

The principle by which this desired motion is accomplished, may be understood by considering Figure 6. If the cam plate 91 were omitted, and the motor support 60 were merely rocked counterclockwise about the hinge pins 68, it can be seen that the upper part of the blade 125 would move to the left as viewed in Figure 6, through a considerable distance. This is what happens with the conventional mounting arrangement of portable saws. In order to overcome this lateral translation, the motor support 60 is moved to the right, by the concurrent rotation of the yoke 40 counterclockwise. The movements of the yoke and motor support with respect to one another and with respect to the table top, are coordinated by the cam plate 91. With the arrangement shown, the resultant angular motion of the blade is essentially the same as the motion of the blade in the heavy and expensive cradle and track system. It will be observed that, in moving from the position shown in Figure 4 to that shown in Figure 6, the rotation of the yoke moves the motor support, hence the blade, downwardly a short distance. This is an additional virtue of the system of this invention. When the blade is at its maximum depth of cut in its perpendicular position, the free end of the spindle 121 would jam against the underside of the plate 16 if the blade were tilted without being lowered. By lowering the blade automatically, the maximum depth of cut possible without jamming the spindle, is automatically maintained. For cuts of lesser depth, the depth can be gauged after the blade has been set at the desired angle. It is to be observed that the depth of cut can be adjusted at any angular position of the blade, since the depth adjustment mechanism, being contained in and on the motor support, is independent of the mechanism by which the angular adjustment is made.

The chief function of the spring 88 is to keep the slack out of the linkage arrangement.

Numerous variations in the construction of the bench saw of this invention, within the scope of the appended claims, will be apparent to those skilled in the art in the light of the foregoing disclosure. For example, the particular hinging arrangements of the various elements can be varied; the shape and appearance of the elements can be made different; a rigidly mounted angular adjustment clamp plate could be used, with an arcuate slot; the table top can be pivoted at right angles to the pivot of the embodiment shown, and the angular adjustment clamp plate and depth gauge plate could be located on and adjacent the back side of the motor support; the motor hinging arrangement can be omitted in those applications in which no depth adjustment is desired, etc.

It is also apparent that the utility of the invention is not confined to bench saws. Base mounted welding heads, drills, direct-driven jig or sabre saws and various other base-mounted tools having parts the angularity of which with respect to the base it is desirable to change, may be constructed in accordance with this invention.

Having thus described the invention, what is claimed and desired to be secured by Letters Patent is:

1. In a circular saw of the bench type in which a saw blade is mounted on a geared spindle or directly on the shaft of a motor mounted beneath a horizontal table top, with the blade extending through a slot in the table top, the improvement comprising a motor support in the form of an inverted, three-sided pan, two sides of which are perpendicular to said slot; a blade-driving motor hinged to one of said perpendicular sides of said motor support about an axis at right angles to the plane of the blade; a motor support hinge along the open side of said support and mediately hingedly connecting the motor support to said table top along an axis parallel with the plane of the blade but offset laterally from said blade; motor support hinge moving means for moving said motor support hinge laterally with respect to the slot through which the blade projects, and means interconnecting said motor support and said motor support hinge moving means for coordinating the rotation of the motor support about its motor support hinge with the lateral movement of said hinge by the motor support hinge moving means, to guide the tilt of the blade about an axis defined substantially by the intersection of the plane of the table top and the plane of the blade in a position at which the blade is perpendicular to the table top.

2. In a circular saw of the bench type in which a saw blade is mounted on a geared spindle or directly on the shaft of a motor mounted beneath a table top with the blade extending through a slot in the table top, the improvement comprising a yoke hinged to the table top on an axis parallel to the long axis of the slot, but offset therefrom, said yoke having spaced arms extending at right angles to said axis; a motor support hinged to the arms of said yoke on an axis parallel to the yoke hinge axis; a cam plate hinged to said top on an axis parallel to the yoke hinge axis and slidably connected to said motor support and to a yoke arm, and the motor being hinged to said motor support on an axis at right angles to the yoke hinge aixs, with the blade extending within the slot in the table, the cam plate being arranged to correlate the rotation of the motor support about the motor support hinge axis with the rotation of the yoke arms about the yoke arm axis to rotate the blade about an axis lying within the table top slot, and the motor being rotatable about its hinge axis at any angular position of the motor support.

3. The device of claim 2 wherein a depth gauge plate is mounted on a side of the motor support opposite the side to which the motor is hinged, an angular adjustment clamp plate is mounted on the table top along the same side of the motor support as the depth gauge plate, and manipulable means are provided for clamping the motor to said depth gauge plate and for clamping the motor support to the angular adjustment clamp plate.

4. In a bench saw in which a direct-geared circular saw is mounted beneath a table top, the improvement comprising a base on which said table top is mounted, horizontal pivot means rotatably connecting the table top to said base, latch means carried by said base for selectively holding the table top in level or tilted position, motor support means mediately hinged to the underside of said table top, said saw being hingedly mounted on said motor support means, manipulable motor clamping means for selectively maintaining said motor in desired heightwise relation to said table top, and manipulable motor support clamping means for selectively maintaining said motor support in desired angular relation to said table top, said motor clamping means and said motor support clamping means being exposed for ready manipulation when said table top is in tilted position.

5. In a bench saw in which a direct geared circular saw is mounted beneath a table top with a blade extending through a slot in the table top, the improvement comprising a yoke hinged to the underside of the table top on a hinge axis parallel to the plane of the blade, said yoke having spaced arms extending substantially at right angles to the yoke hinge axis, a motor support hinged to said arms on an axis parallel with the yoke hinge axis, a yoke arm pin extending from one of said yoke arms at a greater radial distance from the yoke hinge axis than the motor support hinge axis, a motor support pin extending from the motor support at a greater radial distance from said motor support hinge axis than the yoke arm pin, a cam plate hinged to the underside of the table top on a hinge axis parallel with the yoke hinge axis, said cam plate having a yoke arm pin slot, into which the yoke arm pin extends and in which the yoke arm pin rides, and a motor support pin slot, into which the motor support pin extends and in which the motor support pin rides, said yoke arm pin slot being straight and said motor support pin slot being arcuate and being positioned at a greater radial distance from the motor support hinge axis than the yoke arm pin slot, said motor being mounted on said motor support with the blade projecting through the slot, whereby rotation of the motor support about its hinge axis is coordinated, by the cam plate, with rotation of the yoke about its yoke axis, to rotate the blade substantially about an axis within the slot in the table top.

6. The device of claim 5 wherein a spring is supported at one end by the motor support, and, at its other end, is connected to the yoke arm from which the yoke arm pin extends.

7. The device of claim 6 wherein the saw is hingedly mounted on the motor support on a hinge axis at right angles to the motor support hinge axis, a depth gauge plate is mounted on the motor support, motor support clamping means are mounted on the motor and manipulably engage the depth gauge plate, an angular adjustment clamping plate is mounted on the underside of the table top, and angular adjustment clamping means are mounted on the motor support and manipulably engage the angular adjustment clamping plate.

8. In a tool having a part to be tilted about an imaginary, fixed tilt axis which is spaced laterally from a hinge by which the tool is supported for rotation, said hinge having an axis parallel to said tilt axis, the improvement comprising a yoke hinged to a panel on an axis parallel with the tilt axis, said yoke having arms, a tool support hinged to said arms on an axis parallel with but offset from said yoke and tilt axes, and a cam plate hinged to said panel on an axis parallel with said tilt, yoke hinge and tool support hinge axes and at a position on said panel more remote from the tilt axis than said yoke axis, said cam plate being slidably connected to a yoke arm at a position more remote from the yoke axis than the tool support hinge axis, and to the tool support at a place offset from said tool support hinge axis, to correlate the rotation of the tool support about its hinge with the rotation of the yoke about its hinge, to tilt the tool part about its tilt axis.

9. The device of claim 3, wherein the table top is pivotally mounted on a base, and the depth guage plate, angular adjustment clamp plate and clamping means are carried by the table top on one side of its pivot axis whereby when said side is tilted about said axis away from said base, the depth guage plate, angular adjustment clamp plate and clamping means are tilted to an exposed position for ready manipulation of the said clamping means.

References Cited in the file of this patent
UNITED STATES PATENTS

| | | |
|---|---|---|
| 366,633 | Mackintosh | July 12, 1887 |
| 403,880 | Farwell | May 21, 1889 |
| 1,988,102 | Woodward | Jan. 15, 1935 |
| 2,292,872 | Eastman | Aug. 11, 1942 |
| 2,319,025 | Wehringer | May 11, 1943 |
| 2,323,247 | Sellmayer | June 29, 1943 |
| 2,601,878 | Anderson | July 1, 1952 |
| 2,653,634 | Mott | Sept. 29, 1953 |